United States Patent
Vinmani et al.

(10) Patent No.: US 9,584,648 B2
(45) Date of Patent: Feb. 28, 2017

(54) METHOD AND SYSTEM FOR MANAGING INCOMING NOTIFICATIONS

(71) Applicant: Brillio LLC, Jersey City, NJ (US)

(72) Inventors: Karthik Gopalakrishnan Vinmani, Bangalore (IN); Renji K Thomas, Bangalore (IN); Gaurav Jain, Bangalore (IN); Puneet Gupta, Bangalore (IN); Venkat Kumar Sivaramamurthy, Bangalore (IN)

(73) Assignee: BRILLIO LLC, Jersey City, NJ (US)

( * ) Notice: Subject to any disclaimer, the term of this patent is extended or adjusted under 35 U.S.C. 154(b) by 70 days.

(21) Appl. No.: 14/836,441

(22) Filed: Aug. 26, 2015

(65) Prior Publication Data

US 2016/0366267 A1  Dec. 15, 2016

(30) Foreign Application Priority Data

Jun. 9, 2015 (IN) .......................... 2882/CHE/2015

(51) Int. Cl.
*H04M 1/725* (2006.01)
*H04W 4/12* (2009.01)
*G06F 3/041* (2006.01)

(52) U.S. Cl.
CPC ...... *H04M 1/72547* (2013.01); *G06F 3/0412* (2013.01); *H04W 4/12* (2013.01)

(58) Field of Classification Search
CPC .. H04M 1/00; H04B 1/18; H04B 7/00; H04B 1/38
USPC ...................................................... 455/550.1
See application file for complete search history.

(56) References Cited

U.S. PATENT DOCUMENTS

| | | | |
|---|---|---|---|
| 7,756,726 | B2 | 7/2010 | Thuerk |
| 8,405,572 | B1 | 3/2013 | Want et al. |
| 8,751,500 | B2 | 6/2014 | Duarte et al. |
| 8,811,951 | B1 | 8/2014 | Faaborg et al. |
| 8,856,948 | B1 | 10/2014 | Robison et al. |
| 8,966,656 | B2 | 2/2015 | Hirsch et al. |
| 2010/0162388 | A1 | 6/2010 | Baugher |
| 2014/0237508 | A1 | 8/2014 | Amundsen |
| 2014/0253319 | A1 | 9/2014 | Chang |
| 2014/0253412 | A1 | 9/2014 | Blaich et al. |
| 2014/0280578 | A1 | 9/2014 | Barat et al. |
| 2014/0366123 | A1 | 12/2014 | DiBona et al. |
| 2015/0015502 | A1 | 1/2015 | Al-Nasser |
| 2015/0049591 | A1 | 2/2015 | Adams et al. |
| 2015/0082255 | A1 | 3/2015 | DeVries et al. |

(Continued)

FOREIGN PATENT DOCUMENTS

JP  4771942 B2  9/2011

OTHER PUBLICATIONS

Ryan Lepinski, Android Notification Improvements.

*Primary Examiner* — Huy C Ho

(57) ABSTRACT

Embodiments herein provide a method for managing an incoming notification. The method includes displaying, on a secondary display of a wearable device, an indication of the incoming notification, wherein the secondary display is located on a strap of the wearable device. The method includes receiving, by the wearable device, an input on the indication of the incoming notification displayed on the secondary display. The method includes performing, on a primary display of the wearable device, at least one action associated with the incoming notification based on the input.

15 Claims, 11 Drawing Sheets

(56) References Cited

U.S. PATENT DOCUMENTS

2015/0082446 A1 3/2015 Flowers et al.
2015/0186092 A1* 7/2015 Francis ................ G06F 3/1423
                                                            345/520

* cited by examiner

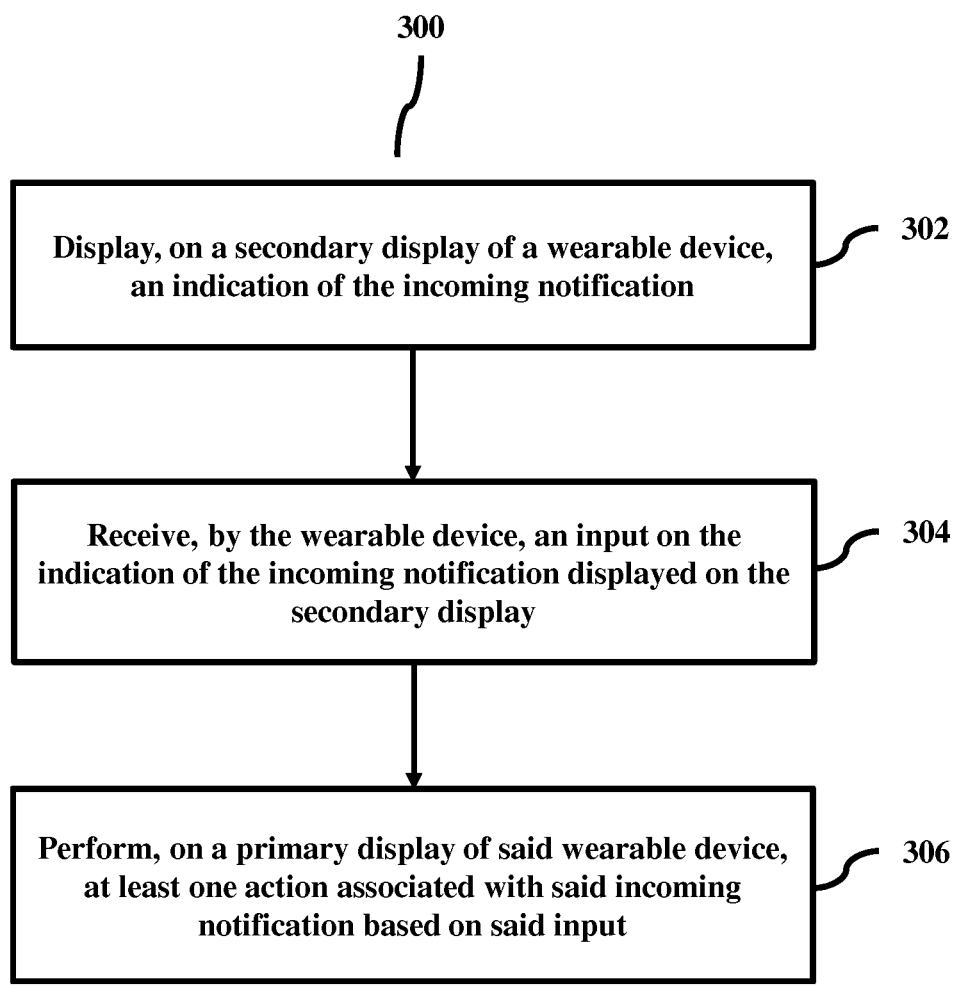

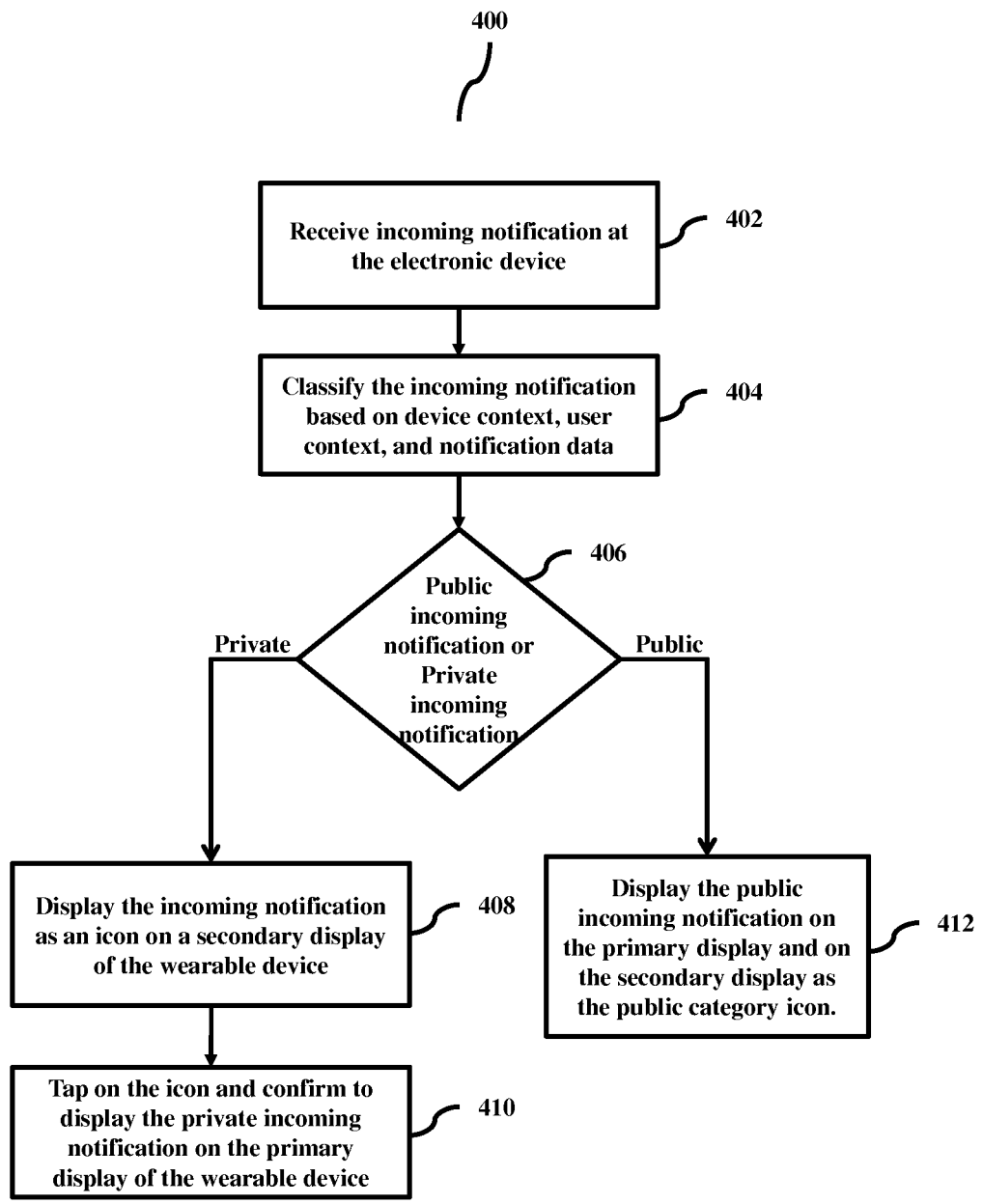

METHOD AND SYSTEM FOR MANAGING INCOMING NOTIFICATIONS

TECHNICAL FIELD

This application claims the benefit of Indian Complete Application No. 2882/CHE/2015, filed on Jun. 9, 2015. The embodiments disclosed herein relate to wearable devices and more particularly to a method and system for managing an incoming notification by a wearable device.

BACKGROUND OF INVENTION

Electronic devices such as a Smart phone receives various notifications such as a Short Message Service (SMS), an email, and calendar alerts when the notifications are pushed from a service provider. As a result, a user may be presented with a stack or a burst of notifications on the electronic devices. Further, the user may use other electronic devices such as a wearable device to receive the notifications. For example, the user may use the wearable device to receive and view the notifications received on the Smart phone.

Different systems and methods are proposed to categorize and display the notifications on various electronic devices of the user. In one mechanism, the notifications are simply pushed and then displayed on the electronic devices as it comes. Such a burst of the notifications in some scenarios could be intrusive to the user. In some scenarios, the notifications may not be useful to the user at that instance and are required to be viewed later. Further, an urgent or critical notification may get missed by the user while viewing a burst of notifications.

In another mechanism, the notifications are displayed on various electronic devices of the user. In some instances, an individual other than the user of the electronic devices may be able to view the notifications or corresponding information. More particularly, when a notification on the wearable device such as a Smart Watch is received then an individual (other than the user using the wearable device) may be able to view the notifications or corresponding information displayed on the wearable device, resulting in a potential privacy concern for the user of the wearable device.

Further, the conventional systems and methods allow an option to silent the notifications entirely or per application basis on the wearable device. Such option may result in missing critical notifications such as an emergency notification by the user. Other options can be using privacy filter on viewing screens for protecting or hiding the notification. Specifically, a privacy filter is used to darken side viewing of the display to prevent other users from reading or viewing the notification or corresponding information. The privacy filters, however, are often bulky and cumbersome such that they are not incorporated on the wearable devices.

The above information is presented as background information only to help the reader to understand the present invention. Applicants have made no determination and make no assertion as to whether any of the above might be applicable as Prior Art with regard to the present application.

SUMMARY

Accordingly the embodiments herein provide a system for managing an incoming notification. The system comprises an electronic device configured to transmit the incoming notification. The wearable device comprises a primary display, a secondary display, and a strap extending from the primary display to the secondary display. The strap is capable of being worn by a user. The wearable device is configured to receive the incoming notification from the electronic device. The wearable device is configured to display, on the secondary display, an indication of the incoming notification. The wearable device is configured to receive an input on the indication of the incoming notification displayed on the secondary display. The wearable device is configured to perform, on the primary display, at least one action associated with the incoming notification based on the input.

Accordingly the embodiments herein provide a method for managing an incoming notification. The method includes displaying, on a secondary display of a wearable device, an indication of the incoming notification, wherein the secondary display is located on a strap of the wearable device. The method includes receiving, by the wearable device, an input on the indication of the incoming notification displayed on the secondary display. The method includes performing, on a primary display of the wearable device, at least one action associated with the incoming notification based on the input.

Accordingly the embodiments herein provide a wearable device for managing an incoming notification. The wearable device comprises a primary display, a secondary display, and a strap extending from the primary display to the secondary display, wherein the strap is capable of being worn by a user. The wearable device comprises a controller module configured to display, on the secondary display, an indication of the incoming notification. The controller module is configured to receive an input on the indication of the incoming notification displayed on the secondary display. The controller module is configured to perform, on the primary display, at least one action associated with the incoming notification based on the input.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications can be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which:

FIG. 3 is a flow diagram illustrating a method for managing the incoming notification on the wearable device, in accordance with an embodiment described herein;

FIG. 4 is a flow diagram illustrating another method for managing the incoming notification on the wearable device, in accordance with an embodiment described herein;

DETAILED DESCRIPTION OF INVENTION

Figure 1:
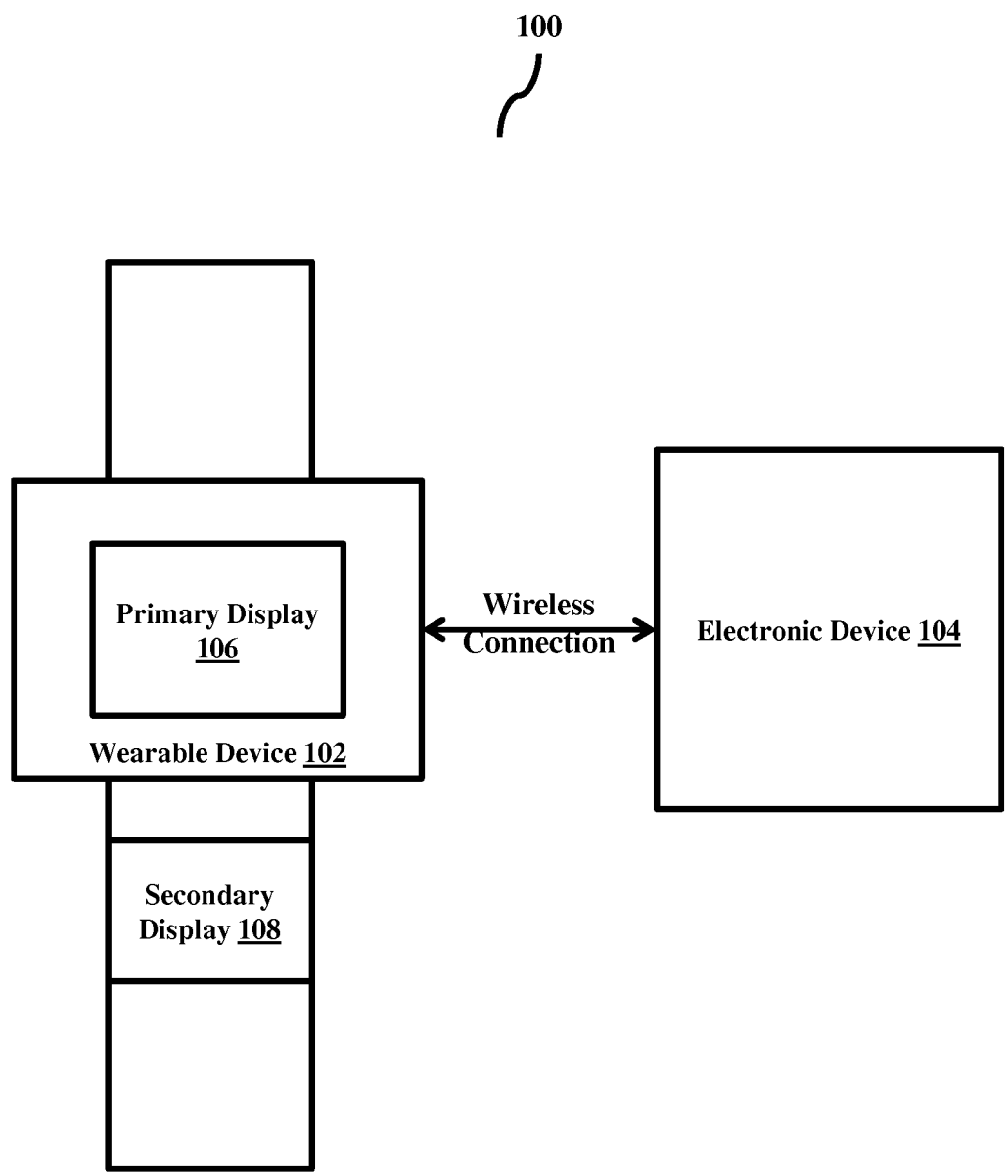
FIG. 1 illustrates a high level overview of a system comprising an electronic device communicating with a wearable device, in accordance with an embodiment described herein.

The embodiments herein and the various features and details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein provide a method and system for managing an incoming notification. The method includes displaying, on a secondary display of a wearable device, an indication of the incoming notification. The secondary display is located on a strap of the wearable device. The method includes receiving, by the wearable device, an input on the indication of the incoming notification displayed on the secondary display. The method includes performing, on a primary display of the wearable device, one or more actions associated with the incoming notification based on the input.

The incoming notification is a private incoming notification or a public incoming notification. The incoming notification is classified as the private incoming notification or the public incoming notification based on one or more parameters. The one or more parameters may include, but is not limited to, user context, nature of data, time of a day, a day of a month, a month of a year, intent of a user, and electronic device context. The classification is performed by a controller module of an electronic device. The incoming notification is received by the wearable device from the electronic device. The electronic device may be connected to the wearable device through a wireless connection. The wireless connection may be a Wireless Fidelity (Wi-Fi) connection, a Bluetooth Low Energy (BLE) connection, or the like.

The proposed system and method are simple and robust for effectively managing the incoming notification by the wearable device. The proposed system and method enables display of the incoming notification based on a type of classification. If the type of classification is private, then the indication of the incoming notification is initially displayed on the secondary display of the wearable device. Unlike the existing systems, as the secondary display is located on the strap of the wearable device, the indication of the incoming notification may not be directly visible to a user other than the user in possession of the wearable device. Also, the incoming notification may be displayed on the primary display of the wearable device if the user desires to view the incoming notification. Further, the proposed system and method can be implemented using existing infrastructure and may not require extensive setup and instrumentations.

Referring now to the drawings and more particularly to FIGS. 1 to 11 where similar reference characters denote corresponding features consistently throughout the figures, there are shown preferred embodiments.

FIG. 1 illustrates a high level overview of a system 100 comprising an electronic device 104 communicating with a wearable device 102, in accordance with an embodiment described herein. In an embodiment, the wearable device 102 may be connected to the electronic device 104 through a wireless connection. The wireless connection may be a Wireless Fidelity (Wi-Fi) connection, a Bluetooth Low Energy (BLE) connection, or the like.

In an embodiment, the electronic device 104 described herein may be for example, a cellular phone, a smart phone, a mobile phone, a wireless organizer, a personal digital assistant, a tablet, a handheld communication device, or the like.

In an embodiment, the wearable device 102 described herein may be a smart watch. Further, the wearable device 102 may include a primary display 106 and a secondary display 108. The wearable device 102 further comprises a strap extending from the primary display 106 to the secondary display 108. The strap is capable of being worn by a user. Further, the secondary display 108 may be located on the strap of the wearable device 102 as shown in the FIG. 1.

The electronic device 104 can be configured to receive the incoming notification from a service provider or a server. After receiving the incoming notification, the electronic device 104 can be configured to classify the incoming notification as a private incoming notification or a public incoming notification based on one or more parameters. The one or more parameters may include, but is not limited to, device-context, user-context, and incoming notification-data. The device context may be determined based on a connection of the wearable device 102 with the electronic device 104. The device context may also be determined based on whether the user is wearing the wearable device 102. The user context may be determined based on time, location, meeting schedule of the user, schedules or calendar events, presence of the user at office, the presence of the user at home, the presence of the user in-vehicle, or the like.

Further, the incoming notification-data is content of the incoming notification indicating whether the incoming notification includes private content or public content. For example, if the incoming notification is an email or a Short Message Service (SMS) from a private contact then the incoming notification may be classified as the private incoming notification. In another example, if the incoming notification is a voice call from a private contact, then the incoming notification may be classified as the private incoming notification. Similarly, if the incoming notification is associated with a public calendar event, then the incoming notification may be classified as the public incoming notification.

When the wearable device 102 is connected through the wireless connection with the electronic device 104, the incoming notification may be pushed to the wearable device 102. The wearable device 102 can be configured to display an indication of the incoming notification on the secondary display 108 of the wearable device 102. If the incoming notification is the private incoming notification, the incoming notification may be displayed as an icon on the secondary display 108. The icon may indicate that the incoming notification is the private incoming notification. Similarly, if the incoming notification is the public incoming notification, the public incoming notification may be displayed as a public category icon on the secondary display 108.

Further, the wearable device 102 can be configured to receive an input on the indication of the incoming notification displayed on the secondary display 108. The input may include, but is not limited to, a touch input, a click, or the like. In one embodiment, the input may be provided by the user.

Furthermore, the wearable device 102 can be configured to perform, on the primary display 106 of the wearable device 102, one or more actions associated with the incoming notification based on the input. The one or more actions may include, but is not limited to, displaying content corresponding to the incoming notification on the primary display 106 or answering or rejecting an incoming voice call.

For example, consider that the incoming notification is the private incoming notification. The private incoming notification may be a SMS including bank account details of the user. The SMS may be indicated as the icon on the secondary display 108. If the user desires to view the SMS, the user may provide the input on the secondary display 108 though a click or a touch input. The wearable device 102 may display content of the SMS on the primary display 106 based on the input provided by the user on the secondary display 108.

In another example, consider that the incoming notification is the public incoming notification. The public notification may be a promotional SMS. As the SMS is public, the SMS may be displayed on the primary display 106 of the wearable device 102 and the public category icon indicating the public incoming notification may be displayed on the secondary display 108 of the wearable device 102.

The system 100 can be configured to classify and display the incoming notifications on the wearable device 102 to make it more meaningful to the user at a given point in time. In an embodiment, classification of the incoming notification as the private incoming notification or the public incoming notification may be configured by the user on the electronic device 104. Also, the one or more incoming private notifications pushed from the electronic device 104 to the secondary display 108 of the wearable device 102 can be first viewed privately or secretly on the secondary display 108. The user also has an option to touch the secondary display 108 to decide the action to be performed on the incoming notification. The strategic positioning of the secondary display 108 on the wearable device 102 helps in minimizing eavesdropping or snooping in public places, meetings, or concerts. Further, unlike the conventional systems, receiving the incoming notification first on the secondary display 108 of the wearable device 102 makes the incoming notification less intrusive to the user.

The FIG. 1 illustrates a limited overview of the system 100 but, it is to be understood that other embodiments are not limited thereto. The labels provided to each module or component is only for illustrative purpose and does not limit the scope of the invention. Further, the one or more components can be combined or separated to perform the similar or substantially similar functionalities without departing from the scope of the invention. Furthermore, the system 100 can include various other modules or components interacting locally or remotely along with other hardware or software components to communicate with each other for managing the incoming notification by the wearable device 102.

Figure 2A:
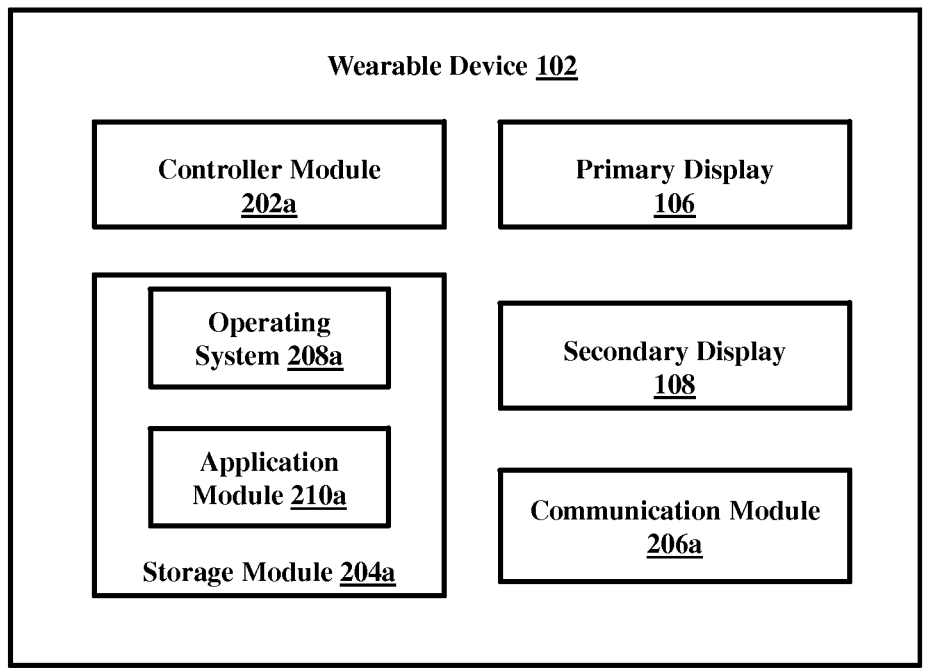
FIG. 2a illustrates a block diagram of the wearable device configured for managing the incoming notification, in accordance with an embodiment described herein.

FIG. 2a illustrates a block diagram of the wearable device 102 configured for managing the incoming notification, in accordance with an embodiment described herein. In an embodiment, the wearable device 102 includes a controller module 202a, a storage module 204a, a communication module 206a, the primary display 106, and the secondary display 108.

The controller module 202a can be configured to display, on the secondary display 108 of the wearable device 102, an indication of the incoming notification. The secondary display 108 is located on the strap of the wearable device 102. The controller module 202a can be configured to receive an input on the indication of the incoming notification displayed on the secondary display 108. The controller module 202a can be configured to perform, on the primary display 106 of the wearable device 102, at least one action associated with the incoming notification based on the input.

The incoming notification is received by the controller module 202a from the electronic device 104. The incoming notification is the private incoming notification or the public incoming notification. The incoming notification is classified as the private incoming notification or the public incoming notification based on one or more parameters. The one or more parameters may include, but is not limited to, user context, nature of data, time of a day, a day of a month, a month of a year, an intent of a user, and electronic device context.

The storage module 204a may encompass one or more memory devices such as a read-only memory, a random access memory, a static random access memory, a dynamic random access memory, or the like. The storage module 204a can be configured to store data. The controller module 202a can be configured to retrieve the data from the storage module 204a. The data that is stored by the storage module 204a may include an operating system 208a and an application module 210a. The operating system 208a includes executable code that controls basic functions of the wearable device 102, such as interaction among the various internal components, communication with external devices via wireless transceivers or component interface, and storage and retrieval of application and data to and from the storage module 204a.

Further, the input provided by the user on the secondary display 108 is further provided as an input to the operating system 208a and is available at the application module 210a by Operating System Application Program Interfaces (OS APIs). Further, the application module 210a can be configured to select the secondary display 108 or the primary display 106 for displaying the incoming notification.

In addition, the storage module 204a may, in some examples, be considered as a non-transitory storage medium. The term "non-transitory" may indicate that the storage medium is not embodied in a carrier wave or a propagated signal. However, the term "non-transitory" should not be interpreted to mean that the storage module 204a is non-movable. In some examples, the storage module 204a may be configured to store larger amounts of information than the memory. In certain examples, a non-transitory storage medium may store data that can, over time, change (e.g., in Random Access Memory (RAM) or cache).

The communication module 206a can be configured to transfer data between the wearable device 102 and the electronic device 104. The communication module 206a can also be configured to transfer the set of instructions internally between various modules in the wearable device 102. Further, the communication module 206a includes sufficient interfaces and channels to allow various components internally or remotely in the system 100 for managing the incoming notification.

Unlike the existing method and system, the wearable device 102 displays the incoming notification based on the type of classification. If the type of classification is private, then the indication of the incoming notification is initially displayed on the secondary display 108 of the wearable device 102. The secondary display 108 is strategically embedded on the strap of the wearable device 102 at a position which offers the user privacy or secrecy when the user is wearing the wearable device 102. Thus, the indication of the incoming notification may not be directly visible to the user other than the user in possession of the wearable device 102.

The FIG. 2a illustrates a limited overview of the wearable device 102 but, it is to be understood that other embodiments are not limited thereto. The labels provided to each module or component is only for illustrative purpose and does not limit the scope of the invention. Further, the one or more modules can be combined or separated to perform the similar or substantially similar functionalities without departing from the scope of the invention. Furthermore, the wearable device 102 can include various other modules or components interacting locally or remotely along with other hardware or software components to manage the incoming notification by the wearable device 102.

Figure 2B:
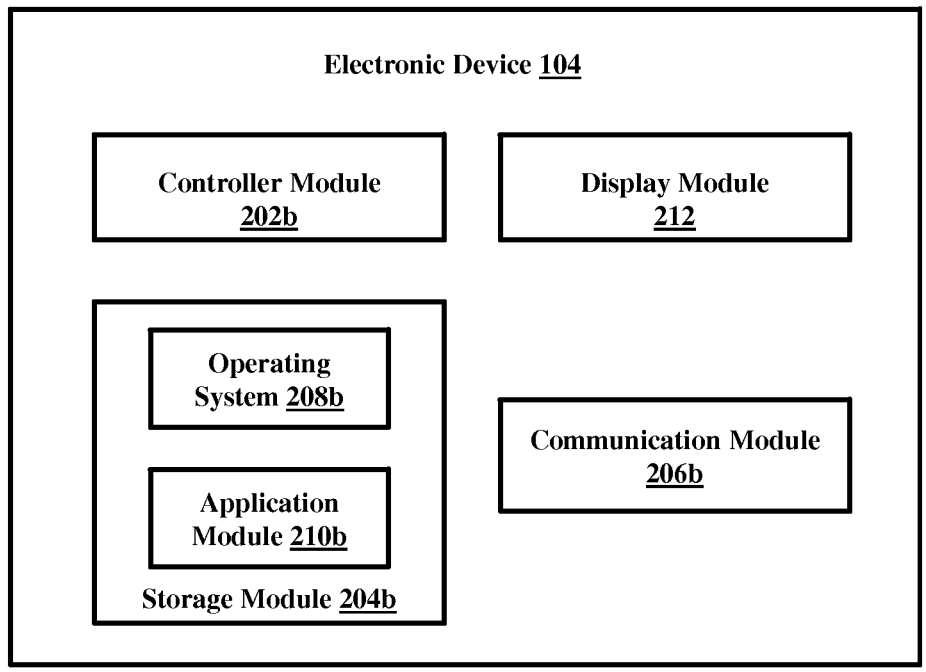
FIG. 2b illustrates a block diagram of the electronic device configured for managing the incoming notification, in accordance with an embodiment described herein.

FIG. 2b illustrates a block diagram of the electronic device 104 configured for managing the incoming notification, in accordance with an embodiment described herein. In an embodiment, the electronic device 104 includes a controller module 202b, a storage module 204b, a communication module 206b, and a display module 212.

The controller module 202b can be configured to receive the incoming notification from the service provider. The display module 212 can be configured to display the incoming notification on the user interface of the electronic device 104. Further, the controller module 202b can be configured to classify the incoming notification as the private incoming notification or the public incoming notification based on the one or more parameters.

The one or more parameters may include, but is not limited to, the device-context, the user-context, and the incoming notification-data. The device context may be determined based on the connection of the wearable device 102 with the electronic device 104. The device context may also be determined based on whether the user is wearing the wearable device 102, or the like. The user context may be determined based on time, location, meeting schedule of the user, schedules or calendar events, presence of the user at office, the presence of the user at home, the presence of the user in-vehicle, or the like.

Further, the incoming notification-data is the content of the incoming notification indicating whether the incoming notification includes the private content or the public content. For example, if the incoming notification is the email or the SMS from the private contact then the incoming notification may be classified as the private incoming notification. In another example, if the incoming notification is the voice call from the private contact, then the incoming notification may be classified as the private incoming notification. Similarly, if the incoming notification is associated with the public calendar event, then the incoming notification may be classified as the public incoming notification.

Further, the communication module 206b can be configured to transmit the incoming notification to the wearable device 102 through the wireless connection. The communication module 206b can also be configured to transfer the set of instructions internally between various modules in the wearable device 102. Further, the communication module 206b includes sufficient interfaces and channels to allow various components internally or remotely in the system 100 for managing the incoming notification.

The storage module 204b may encompass one or more memory devices such as a read-only memory, a random access memory, a static random access memory, a dynamic random access memory, or the like. The storage module 204b can be configured to store data. The controller module 202b can be configured to retrieve the data from the storage module 204b. The data that is stored by the storage module 204b may include an operating system 208b and an application module 210b. The operating system 208b includes executable code that controls basic functions of the wearable device 102, such as interaction among the various internal components, communication with external devices via wireless transceivers or component interface, and storage and retrieval of application and data to and from the storage module 204b.

FIG. 3 is a flow diagram illustrating a method 300 for managing the incoming notification by the wearable device 102, in accordance with an embodiment described herein.

At step 302, the method 300 includes displaying, on the secondary display 108 of the wearable device 102, the indication of the incoming notification. The secondary display 108 is located on the strap of the wearable device 102. The method 300 allows the wearable device 102 to display the indication of the incoming notification.

The incoming notification is the private incoming notification or the public incoming notification. The incoming notification is classified as the private incoming notification or the public incoming notification based on one or more parameters. The one or more parameters may include, but is not limited to, user context, nature of data, time of a day, a day of a month, a month of a year, intent of a user, and electronic device context. The classification is performed by the controller module 202b of the electronic device 104.

At step 304, the method 300 includes receiving the input on the indication of the incoming notification displayed on the secondary display 108. The method 300 allows the wearable device 102 to receive the input on the indication of the incoming notification.

At step 306, the method 300 includes performing, on the primary display 106 of the wearable device 102, one or more actions associated with the incoming notification based on the input. In one embodiment, the method 300 allows the wearable device 102 to perform the one or more actions associated with the incoming notification based on the input.

Unlike the existing method and system, the proposed method 300 enables display of the incoming notification based on the type of classification. If the type of classification is private, then the indication of the incoming notification is initially displayed on the secondary display 108 of the wearable device 102. As the secondary display 108 is located on the strap of the wearable device 102, the indication of the incoming notification may not be directly visible to the user other than the user in possession of the wearable device 102.

The method 300 and other description described herein provide a basis for a control program which can be easily implement by a microcontroller, a microprocessor, or a combination thereof. The various actions, acts, blocks, steps, or the like in the method 300 may be performed in the order presented, in a different order or simultaneously. Further, in some embodiments, some of the actions, acts, blocks, steps, or the like may be omitted, added, modified, skipped, and the like without departing from scope of the invention.

FIG. 4 is a flow diagram illustrating another method 400 for managing the incoming notification by the wearable device 102, in accordance with an embodiment described herein.

At step 402, the method 400 includes receiving the incoming notification by the electronic device 104. The electronic device 104 may receive the incoming notification from the service provider or the server.

At step 404, the method 400 includes classifying the incoming notification based on device context, user context, and the incoming notification data. The incoming notification can be classified as the private incoming notification or the public incoming notification. The method 400 allows the electronic device 104 to classify the incoming notification.

At step 406, the method 400 includes checking whether the incoming notification is the private incoming notification or the public incoming notification. The method 400 allows the electronic device 104 to check whether the incoming notification is the private incoming notification or the public incoming notification.

At step 408, the method 400 includes displaying the incoming notification as the icon on the secondary display 108 of the wearable device 102 if the incoming notification is the private incoming notification. In one embodiment, the method 400 allows the wearable device 102 to display the incoming notification as the icon on the secondary display 108 of the wearable device 102.

At step 410, the method 400 includes tapping on the icon and confirming to display the private incoming notification on the primary display 106 of the wearable device 102. In one embodiment, the method 400 allows the user to tap on the icon. After tapping the icon, i.e. after receiving the input, the method 400 allows the wearable device 102 to perform one or more actions on the primary display 106 of the wearable device 102. The one or more actions may include displaying the private incoming notification on the primary display 106 of the wearable device 102.

If the incoming notification is the public incoming notification, at step 412, the method 400 includes displaying the public incoming notification on the primary display 106 and on the secondary display 108 as the public category icon. Further, the method 400 allows the user to perform a tap action on the public incoming notification displayed on the primary display 106. After performing the tap action, the content corresponding to the public incoming notification is displayed on the primary display 106.

The method 400 and other description described herein provide a basis for a control program which can be easily implement by a microcontroller, a microprocessor, or a combination thereof. The various actions, acts, blocks, steps, or the like in the method 400 may be performed in the order presented, in a different order or simultaneously. Further, in some embodiments, some of the actions, acts, blocks, steps, or the like may be omitted, added, modified, skipped, or the like without departing from scope of the invention.

Figure 5:
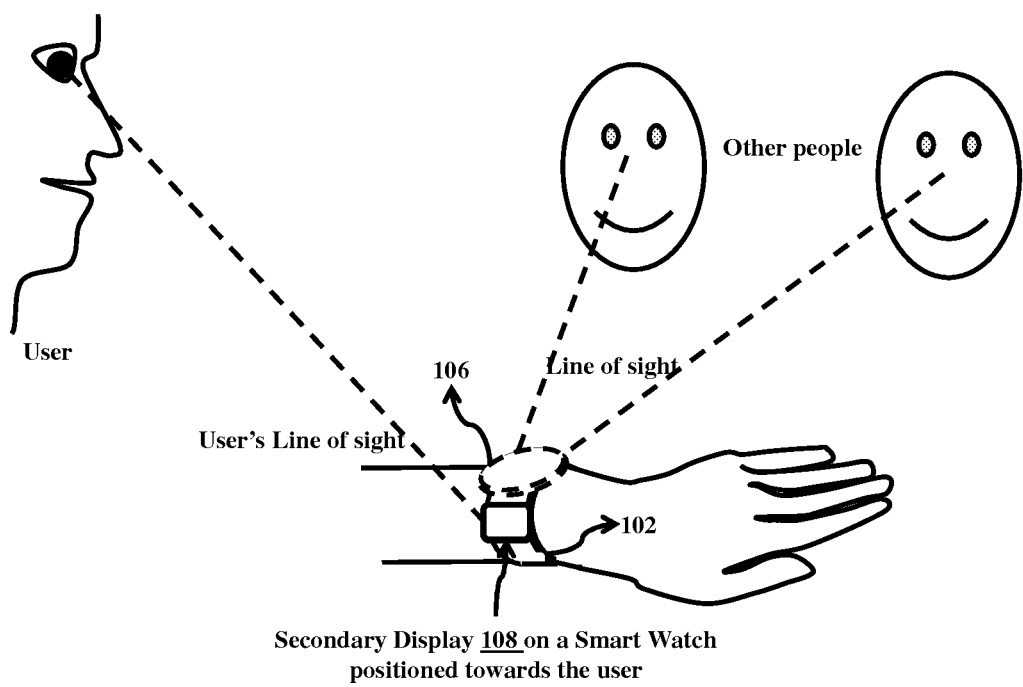
FIG. 5 illustrates an example scenario of a user wearing the wearable device comprising the secondary display and the primary display, in accordance with an embodiment described herein.

FIG. 5 illustrates an example scenario of a user wearing the wearable device 102 comprising the secondary display 108 and the primary display 106, in accordance with an embodiment described herein. In an embodiment, consider that the wearable device 102 is a smart watch. As illustrated in the FIG. 5, the user may be wearing the smart watch. The smart watch comprises of the primary display 106 and the secondary display 108. The secondary display 108 is located on the strap of the smart watch.

In an example scenario, the user may be surrounded by people. Further, consider that the smart watch receives the private incoming notification from the electronic device 104. As the secondary display 108 is strategically located on the strap of the smart watch the private incoming notification displayed on the secondary display 108 is visible only to the user, thereby maintaining the privacy of the user.

Figure 6A:
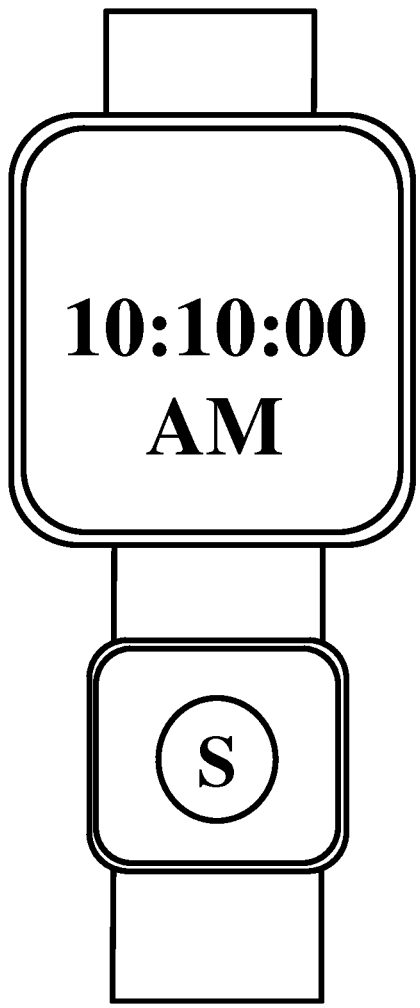
FIGS. 6a-6b illustrate an example scenario for managing an incoming notification when a private incoming notification is received by the wearable device, in accordance with an embodiment described herein.
Figure 6B:
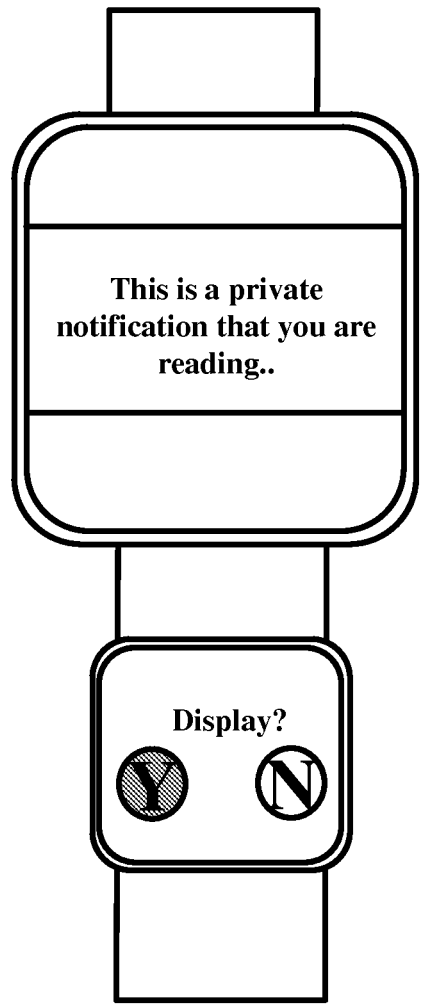

FIGS. 6a-6b illustrate an example scenario for managing the incoming notification when the private incoming notification is received by the wearable device 102, in accordance with an embodiment described herein. As shown in the FIG. 6a, the private incoming notification is received by the wearable device 102. As the incoming notification is the private incoming notification, the incoming notification is displayed as the icon on the secondary display 108. Simultaneously, the primary display 106 may display a last state such as time, temperature, weather conditions, or the like.

Further, the user may click or tap on the icon on the secondary display 108, embedded on the strap, to display confirmation icons 'YES' and 'NO' as shown in the FIG. 6b. If the user taps on 'YES', the content corresponding to the incoming private notification is displayed on the primary display 106 of a smart watch (wearable device 102) thereby maintaining the privacy or secrecy of the incoming private notification. The privacy of the user is maintained as a choice is provided to the user to view the content corresponding to the private incoming notification according to convenience of the user.

Figure 7:
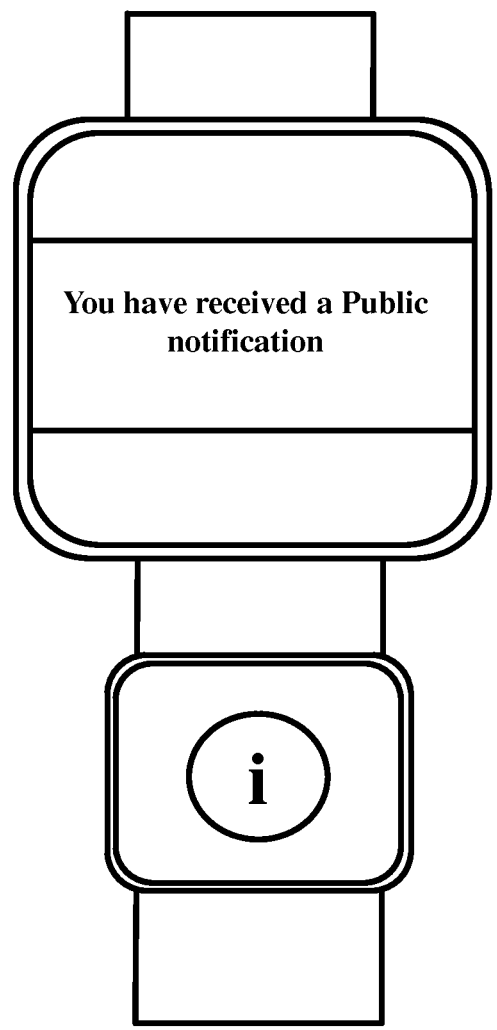
FIG. 7 illustrates another example scenario for managing an incoming notification when a public incoming notification is received by the wearable device, in accordance with an embodiment described herein.

FIG. 7 illustrates another example scenario for managing the incoming notification when the public incoming notification is received by the wearable device 102, in accordance with an embodiment described herein. When the public incoming notification is received by the wearable device 102, the public incoming notification is displayed on the primary display 106 and on the secondary display 108 as the public category icon. Further, the user may perform a tap action on the public incoming notification to view the content corresponding to the public incoming notification. After performing the tap action, the content is displayed on the primary display 106.

Figure 8A:
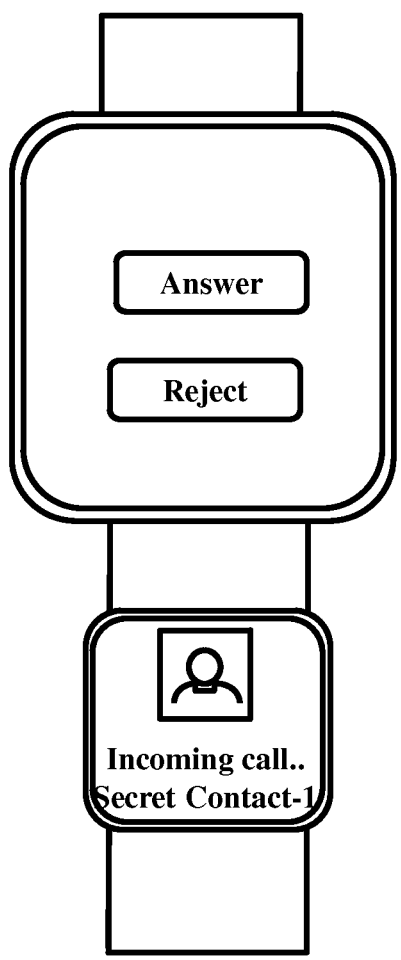
FIGS. 8a-8b illustrate another example scenario for managing an incoming notification when a voice call from a private contact is received by the wearable device, in accordance with an embodiment described herein.
Figure 8B:
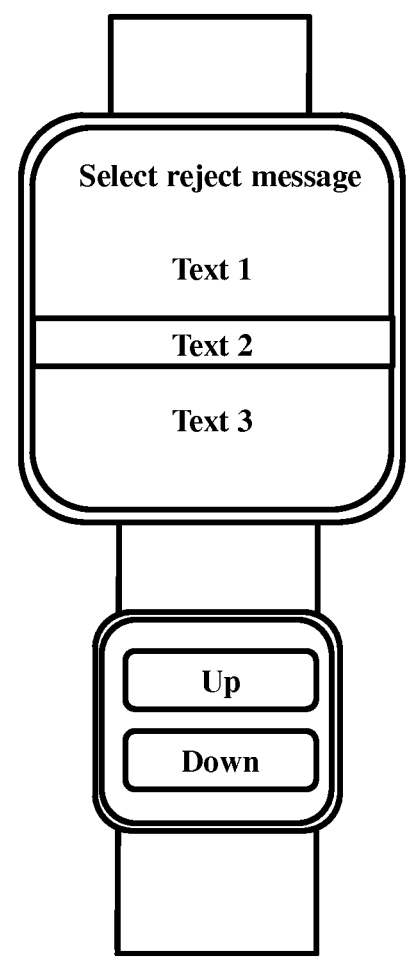

FIGS. 8a-8b illustrate another example scenario for managing the incoming notification when a voice call from a private contact (private incoming notification) is received by the wearable device 102, in accordance with an embodiment described herein. In an embodiment, consider that the private incoming notification is the voice call from the private contact. As shown in the FIG. 8a, the voice call is displayed on the secondary display 108 of the wearable device 102. As, the voice call is the private incoming notification, contact head or photo of the private contact is not displayed on the primary display 106. Also, two icons 'Answer' and 'Reject' may be displayed on the primary display 106 of the wearable device 102. Consider that the user selects to reject the voice call. The user may click on the 'Reject' icon to reject the voice call. As shown in the FIG. 8b, the wearable device 102 displays reject messages on the primary display 106 based on the input provided by the user. The input may correspond to the click on the 'Reject' icon.

The user may also scroll through the reject messages displayed on the primary display 106 using 'Up' and 'Down' icons displayed on the secondary display 108.

Figure 9A:
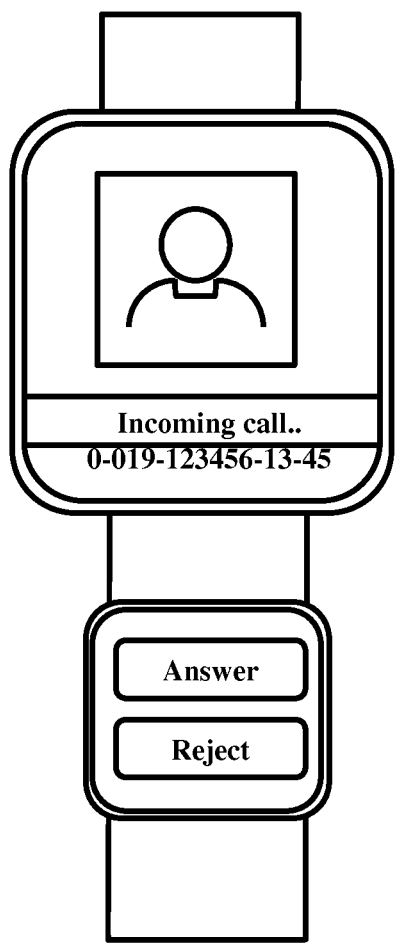
FIGS. 9a-9b illustrate another example scenario for managing an incoming notification when a voice call from a public contact is received by the wearable device, in accordance with the embodiments described herein.
Figure 9B:
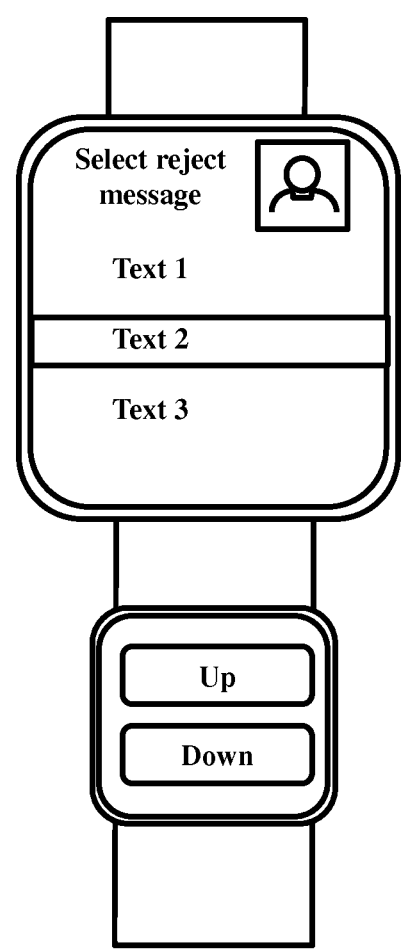

FIGS. 9a-9b illustrate another example scenario for managing the incoming notification when the voice call from a public contact (public incoming notification) is received by the wearable device 102, in accordance with an embodiment described herein.

In one embodiment, consider that the public incoming notification is the voice call from one of the contacts of the user. As shown in the FIG. 9a, the voice call is displayed on the primary display 106 of the wearable device 102. Further, the contact head or the photo of the contact may be displayed on the primary display 106 as the voice call is the public incoming notification. Also, two icons 'Answer' and 'Reject' may be displayed on the secondary display 108 of the wearable device 102. Consider that the user selects to reject the incoming voice call. The user may click on the 'Reject' icon to reject the voice call. As shown in the FIG. 9b, the wearable device 102 displays the reject messages on the primary display 106 based on the input provided by the user. The input corresponds to the click on the 'Reject' icon.

The user may also scroll through the reject messages displayed on the primary display 106 using the 'Up' and 'Down' icons displayed on the secondary display 108.

Figure 10:
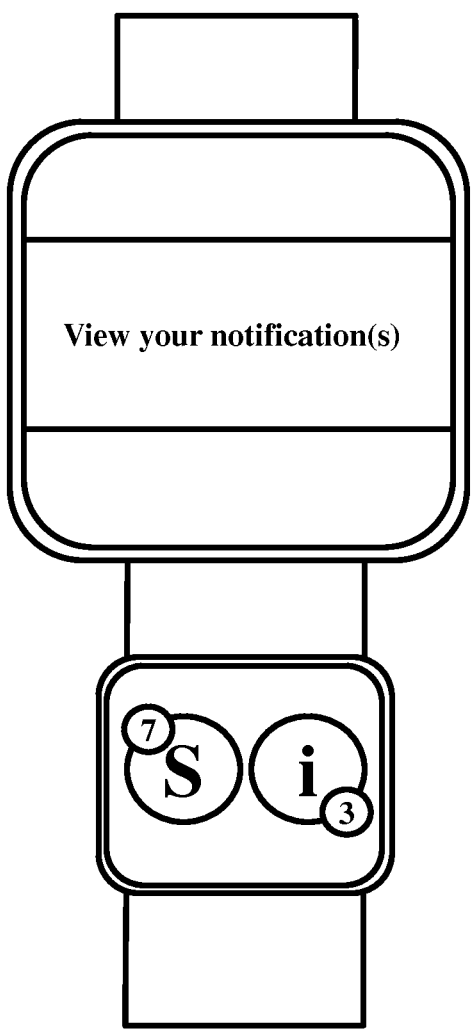
FIG. 10 illustrates an example scenario for viewing the incoming notifications on the wearable device, in accordance with an embodiment described herein.

FIG. 10 illustrates an example scenario for viewing the incoming notifications on the wearable device 102, in accordance with an embodiment described herein.

As illustrated in the FIG. 10, an icon including a numeral represents a number of incoming notifications. Also, the icon including a character 'i' represents the public incoming notification and the icon including the character 'S' represents the private incoming notification. The icons may be displayed on the secondary display 108 of the wearable device 102.

The user may select to view the incoming notification list by clicking on the icon corresponding to the private incoming notification or the icon corresponding to the public incoming notification. After clicking on the icon, the incoming notifications may be displayed as a list on the primary display 106 of the wearable device 102.

Figure 11:
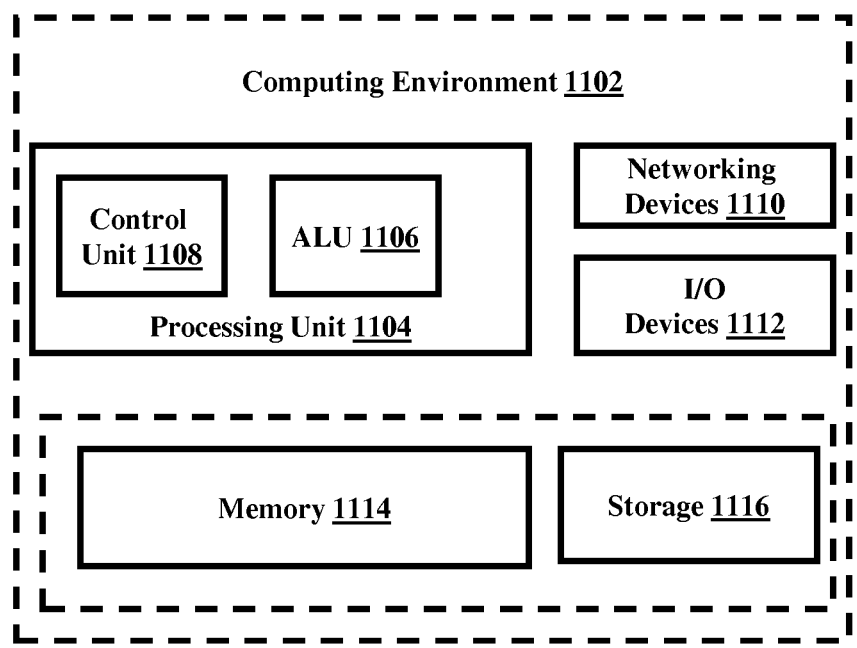
FIG. 11 illustrates a computing environment implementing the method for managing an incoming notification by the wearable device, in accordance with an embodiment described herein.

Referring to FIG. 11, a computing environment 1102 implementing the method for managing the incoming notification by the wearable device 102 is illustrated. As depicted, the computing environment 1102 includes at least one processing unit 1104 that is equipped with a control unit 1108 and an Arithmetic Logic Unit (ALU) 1106, a memory 1114, a storage 1116, a plurality of networking devices 1110 and a plurality Input output (I/O) devices 1112. The processing unit 1104 is responsible for processing the instructions of the technique. The processing unit 1104 receives commands from the control unit 1108 in order to perform its processing. Further, any logical and arithmetic operations involved in the execution of the instructions are computed with the help of the ALU 1106.

The overall computing environment 1102 can be composed of multiple homogeneous or heterogeneous cores, multiple CPUs of different kinds, special media and other accelerators. The processing unit 1104 is responsible for processing the instructions of the technique. Further, the plurality of processing units 1104 can be located on a single chip or over multiple chips.

The technique comprising of instructions and codes required for the implementation are stored in either the memory 1114 or the storage 1116 or both. At the time of execution, the instructions can be fetched from the corresponding memory 1114 or storage 1116, and executed by the processing unit 1104.

In case of any hardware implementations various networking devices 1110 or external I/O devices 1112 can be connected to the computing environment to support the implementation through the networking unit and the I/O device unit.

The embodiments disclosed herein can be implemented through at least one software program running on at least one hardware device and performing network management functions to control the elements. The FIGS. 1 to 11 include blocks which can be at least one of a hardware device or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A system for managing an incoming notification, the system comprising:
   an electronic device configured to:
      receive said incoming notification;
      classify said incoming notification as a private incoming notification based on a plurality of parameters; and
      transmit said private incoming notification; and
   a wearable device comprising:
      a primary display;
      a secondary display; and
      a strap extending from said primary display to said secondary display, wherein said strap is capable of being worn by a user;
   wherein said wearable device configured to:
      receive said private incoming notification from said electronic device;
      display, on said secondary display, an indication of said private incoming notification;
      receive an input on said indication of said private incoming notification displayed on said secondary display; and
      perform, on said primary display, at least one action associated with said private incoming notification based on said input.

2. The system of claim 1, wherein said at least one parameter comprises user context, an intent of a user, and electronic device context.

3. The system of claim 1, wherein said indication of said private incoming notification is a unique graphical element indicating an availability of said private incoming notification and a count of private incoming notification available on said wearable device.

4. A method for managing an incoming notification, the method comprising:
   receiving, by a controller unit of a wearable device, a private incoming notification from said electronic device, wherein said incoming notification is classified as said private incoming notification based on a plurality of parameters;
   displaying, on a secondary display of said wearable device, an indication of said private incoming notification, wherein said secondary display is located on a strap of said wearable device;
   receiving, by said wearable device, an input on said indication of said private incoming notification displayed on said secondary display; and
   performing, on a primary display of said wearable device, at least one action associated with said private incoming notification based on said input.

5. The method of claim 4, wherein said at least one parameter comprises user context, an intent of a user, and electronic device context.

6. The method of claim 4, wherein said classification is performed by a controller unit of an electronic device, wherein said electronic device is one of a mobile device, a smart phone, a tablet, and a handheld communication device.

7. The method of claim 4, wherein said indication is a unique graphical element indicating an availability of said private incoming notification and a count of private incoming notification available on said wearable device.

8. A wearable device for managing an incoming notification, the wearable device comprising:
   a primary display;
   a secondary display;
   a strap extending from said primary display to said secondary display, wherein said strap is capable of being worn by a user; and
   a controller module configured to:
      receive a private incoming notification from said electronic device, wherein said incoming notification is classified as said private incoming notification based on a plurality of parameters;
      display, on said secondary display, an indication of said private incoming notification;
      receive an input on said indication of said private incoming notification displayed on said secondary display; and
      perform, on said primary display, at least one action associated with said private incoming notification based on said input.

9. The wearable device of claim 8, wherein said at least one parameter comprises user context, an intent of a user, and electronic device context.

10. The wearable device of claim 9, wherein said classification is performed by a controller unit of an electronic device, wherein said electronic device is one of a mobile device, a smart phone, a tablet, and a handheld communication device.

11. The wearable device of claim 8, wherein said indication is a unique graphical element indicating an availability of said private incoming notification and a count of private incoming notification available on said wearable device.

12. A system for managing an incoming notification, the system comprising:
   an electronic device configured to:
      receive said incoming notification;
      classify said incoming notification as a public incoming notification based on a plurality of parameters; and
      transmit said public incoming notification; and
   a wearable device comprising:
      a primary display;
      a secondary display; and
      a strap extending from said primary display to said secondary display, wherein said strap is capable of being worn by a user;
   wherein said wearable device configured to:
      receive said public incoming notification from said electronic device; and
      display an indication of said public incoming notification on said secondary display and said public incoming notification on said primary display simultaneously.

13. The system of claim 12, wherein said at least one parameter comprises user context, an intent of a user, and electronic device context.

14. The system of claim 12, wherein said indication of said public incoming notification is a unique graphical element indicating an availability of said public incoming notification and a count of public incoming notification available on said wearable device.

15. A wearable device for managing an incoming notification, the wearable device comprising:
   a primary display;
   a secondary display;
   a strap extending from said primary display to said secondary display, wherein said strap is capable of being worn by a user; and
   a controller module configured to:
      receive a public incoming notification from said electronic device, wherein said incoming notification is classified as said public incoming notification based on at least one of user context, an intent of a user, and electronic device context;
      display an indication of said public incoming notification on said secondary display and said public incoming notification on said primary display simultaneously, wherein said indication of said public incoming notification is a unique graphical element indicating an availability of said public incoming notification and a count of public incoming notification available on said wearable device.

* * * * *